US010228508B2

(12) United States Patent
Jia et al.

(10) Patent No.: US 10,228,508 B2
(45) Date of Patent: Mar. 12, 2019

(54) OPTICAL MEMBRANE, BACKLIGHT MODULE, DISPLAY DEVICE AND DEVICE FOR MANUFACTURING OPTICAL MEMBRANE

(71) Applicants: BOE TECHNOLOGY GROUP CO., LTD., Beijing (CN); BEIJING BOE MULTIMEDIA TECHNOLOGY CO., LTD., Beijing (CN)

(72) Inventors: Zhishuai Jia, Beijing (CN); Donglei Li, Beijing (CN); Huijun Li, Beijing (CN)

(73) Assignees: BOE TECHNOLOGY GROUP CO., LTD., Beijing (CN); BEIJING BOE MULTIMEDIA TECHNOLOGY CO., LTD., Beijing (CN)

( * ) Notice: Subject to any disclaimer, the term of this patent is extended or adjusted under 35 U.S.C. 154(b) by 123 days.

(21) Appl. No.: 14/911,127

(22) PCT Filed: Aug. 6, 2015

(86) PCT No.: PCT/CN2015/086257
§ 371 (c)(1),
(2) Date: Feb. 9, 2016

(87) PCT Pub. No.: WO2016/165244
PCT Pub. Date: Oct. 20, 2016

(65) Prior Publication Data
US 2017/0059772 A1 Mar. 2, 2017

(30) Foreign Application Priority Data

Apr. 16, 2015 (CN) ...................... 2015 2 0231232 U

(51) Int. Cl.
*F21V 8/00* (2006.01)
*G02F 1/13357* (2006.01)
*G02F 1/1335* (2006.01)

(52) U.S. Cl.
CPC ......... *G02B 6/0093* (2013.01); *G02B 6/0053* (2013.01); *G02B 6/0065* (2013.01);
(Continued)

(58) Field of Classification Search
CPC .. G02B 6/0023; G02B 6/0025; G02B 6/0261; G02B 6/003; G02B 6/0031;
(Continued)

(56) References Cited

U.S. PATENT DOCUMENTS 3,348,264 A * 10/1967 Rice ................... B29C 43/224
359/619
8,297,802 B2 * 10/2012 Ye ....................... G02B 5/0231
362/333

(Continued)

FOREIGN PATENT DOCUMENTS

CN    201844364 U    5/2011
CN    102297368 A    12/2011
(Continued)

OTHER PUBLICATIONS

International Search Report and Written Opinion dated Jan. 7, 2016 regarding PCT/CN2015/086257. Translation provided by Dragon Intellectual Property Law Firm.

*Primary Examiner* — Anh T Mai
*Assistant Examiner* — Michael Chiang
(74) *Attorney, Agent, or Firm* — Harness, Dickey & Pierce, P.L.C.

(57) ABSTRACT

The present disclosure provides an optical membrane, a backlight module, a display device and a device for manufacturing the optical membrane. The optical membrane
(Continued)

includes a strip-like strengthening member arranged on at least one edge of the optical membrane. The backlight module includes the optical membrane. The display device includes the backlight module. The device for manufacturing the optical membrane with a wave-shaped edge includes: a cutter, configured to cut an edge of the optical membrane; and linear members, arranged between two parallel blades of the cutter and configured to press the edge of the optical membrane into a wave shape. Alternatively, the device for manufacturing the optical membrane with a wave-shaped edge includes: a cutter, configured to cut an edge of the optical membrane; and a roller, configured to press the edge of the optical membrane into a wave shape.

11 Claims, 3 Drawing Sheets

(52) U.S. Cl.
CPC ......... *G02B 6/0068* (2013.01); *G02F 1/1336* (2013.01); *G02F 2001/133628* (2013.01); *G02F 2201/50* (2013.01)

(58) Field of Classification Search
CPC .. G02B 6/0051; G02B 6/0053; G02B 6/0055; G02B 6/0056; G02B 6/0063; B29C 59/04; B02B 6/0053

USPC ...................................................... 264/1.34
See application file for complete search history.

(56) References Cited

U.S. PATENT DOCUMENTS

| | | | |
|---|---|---|---|
| 2006/0291243 A1* | 12/2006 | Niioka | G02B 3/08 362/607 |
| 2008/0123364 A1* | 5/2008 | Chang | G02B 6/0016 362/608 |
| 2011/0141389 A1 | 6/2011 | Tabor | |
| 2011/0292318 A1* | 12/2011 | Nakamoto | G02B 6/0016 349/62 |
| 2013/0157524 A1* | 6/2013 | Schmidt | H01R 4/188 439/882 |
| 2014/0126236 A1* | 5/2014 | Song | G02B 6/0036 362/607 |
| 2014/0133133 A1* | 5/2014 | Tyan | F21V 15/04 362/97.2 |

FOREIGN PATENT DOCUMENTS

| | | |
|---|---|---|
| CN | 103486480 A | 1/2014 |
| CN | 104421768 A | 3/2015 |
| CN | 204515300 U | 7/2015 |

\* cited by examiner

OPTICAL MEMBRANE, BACKLIGHT MODULE, DISPLAY DEVICE AND DEVICE FOR MANUFACTURING OPTICAL MEMBRANE

CROSS REFERENCE OF RELATED APPLICATION

This application is the U.S. national phase of PCT Application No. PCT/CN2015/086257 filed on Aug. 6, 2015, which claims a priority of the Chinese Utility Model Application No. 201520231232.8 filed on Apr. 16, 2015, the disclosures of which are incorporated in their entirety by reference herein.

TECHNICAL FIELD

The present disclosure relates to the technical field of displaying, in particular to an optical membrane, a backlight module, a display device and a device for manufacturing the optical membrane.

BACKGROUND

The optical membrane is one of important materials for manufacturing a liquid crystal display (LCD) device. A conventional optical membrane is poor in stiffness, and thus is prone to be deformed and wrinkled upon being heated by hot air. For example, a light strip of the backlight module may generate a considerable amount of heat, and thus it is very likely that the optical membrane of the backlight module is heated by the hot air around the light strip and wrinkled. As illustrated in FIG. 4, the optical membrane 401 is wrinkled to have wrinkle 402 due to being heated by light emitting diodes (LEDs) 403, which adversely impacts quality of the backlight module and display quality of the LCD.

SUMMARY

In view of the above problem, the present disclosure provides an optical membrane, a backlight module, a display device and a device for manufacturing the optical membrane, so as to prevent the optical membrane from generating wrinkles upon being heated.

In one aspect of the present disclosure, it is provided an optical membrane including a strip-like strengthening member arranged on at least one edge of the optical membrane.

Alternatively, the strip-like strengthening member is of a wave shape and formed integrally with the optical membrane.

Alternatively, each ridge line of the wave-shaped strip-like strengthening member is a straight line parallel to the edge of the optical membrane.

Alternatively, the strip-like strengthening member is adhesive coated on the edges of the optical membrane.

Alternatively, the strip-like strengthening member is a strengthening layer coated on the optical membrane.

Alternatively, the strip-like strengthening member is a straight strip-like strengthening member or a curved strip-like strengthening member.

Alternatively, the strip-like strengthening member is arranged on one edge of the optical membrane.

Alternatively, the strip-like strengthening member is arranged on two or more edges of the optical membrane.

Alternatively, the optical membrane is of a rectangular shape, and the strip-like strengthening member is arranged on four edges of the optical membrane.

In another aspect of the present disclosure, it is further provided a backlight module including the optical membrane according to any one of embodiments in the present disclosure.

Alternatively, the backlight module further includes a light strip, wherein the strip-like strengthening member of the optical membrane is arranged on an edge of the optical membrane that is close to the light strip.

In another aspect of the present disclosure, it is further provided a display device including the backlight module according to any one of embodiments in the present disclosure.

In another aspect of the present disclosure, it is further provided a device for manufacturing the optical membrane with wave-shaped edges, including:

a cutter, configured to cut an edge of the optical membrane; and linear members, arranged between two parallel blades of the cutter and configured to press the edge of the optical membrane into a wave shape. Alternatively, positions and quantities of the linear members correspond to positions and quantities of the wave-shaped edges of the optical membrane respectively.

In another aspect of the present disclosure, it is further provided a device for manufacturing the optical membrane with wave-shaped edges, including:

a cutter, configured to cut an edge of the optical membrane; and a roller, configured to press the edge of the optical membrane into a wave shape.

Alternatively, the cutter is connected to the roller, and the roller is connected between two parallel blades of the cutter through a waved-shaped rail.

It can be seen from above that, in the present disclosure, the strip-like strengthening member is arranged on the edge of the optical membrane, so as to prevent the optical membrane from being deformed and wrinkled due to thermal expansion and cold shrinkage of the optical membrane caused by variation of the ambient temperature; and the present disclosure may also prevent the optical membrane from being deformed when the optical membrane is adopted in the display device, so that the display quality is ensured.

DETAILED DESCRIPTION

Hereinafter, it will be discussed in details associated with figures and embodiments for further clarify technical problems, technical solutions and advantages of the present disclosure. Obviously, the following embodiments are merely a part of, rather than all of, the embodiments of the present disclosure, and based on these embodiments a person skilled in the art may obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "a" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Figure 1:
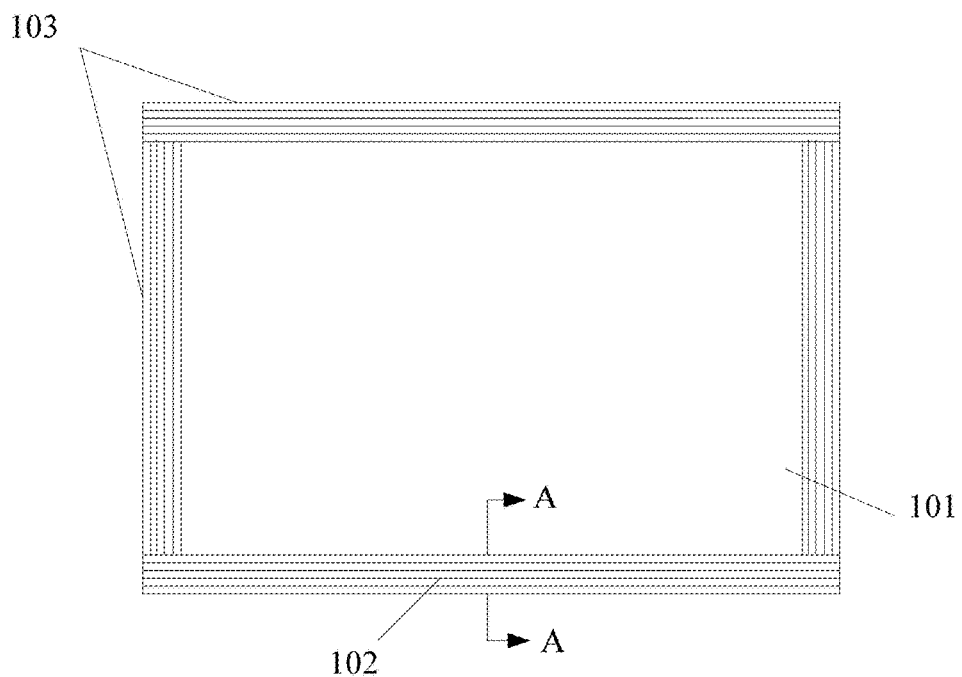
FIG. 1 illustrates an optical membrane according to an embodiment of the present disclosure.

As illustrated in FIG. 1, in an embodiment, it is provided an optical membrane 101 including a strip-like strengthening member 102 arranged on four edges 103 of the optical membrane 101.

It can be seen from above that the strip-like strengthening member is arranged on at least one edge of the optical membrane to strengthen the stiffness of whole or a portion of the optical membrane, so as to prevent the optical membrane from being deformed and wrinkled due to, for example thermal expansion and cold shrinkage of the optical membrane caused by variation of the ambient temperature. Generally, the light-emitting unit of the display device is arranged at a side of the optical membrane. Thus, when such optical membrane is adopted in the display apparatus, the strip-like strengthening member arranged on the edge of the optical membrane may prevent the edge of the optical membrane from being wrinkled when the optical membrane is heated by the heat generated by the light-emitting device in the display device, and thus ensure the display quality.

In some embodiments, the strip-like strengthening member may be a straight strip-like strengthening member (for example, the strip-like strengthening member 1 as illustrated in FIG. 1) or a curved strip-like strengthening member, which is not confined herein.

In some embodiments, the strip-like strengthening member may be arranged on one edge of the optical membrane, or arranged on two or more edges of the optical membrane. Alternatively, the optical membrane is of a rectangular shape, and the strip-like strengthening member may be arranged on four edges of the optical membrane at most.

In some embodiments, the strip-like strengthening member 102 may be of a wave shape and formed integrally with the optical membrane 101.

Figure 2:
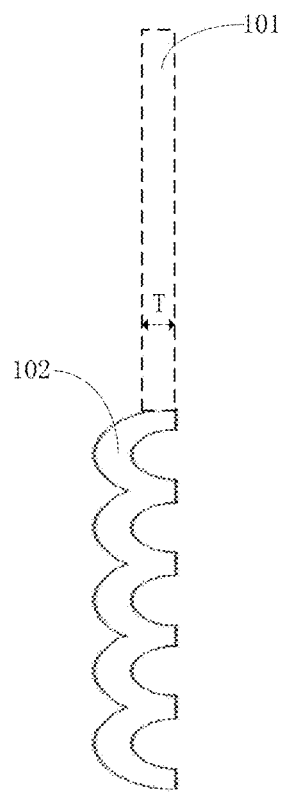
FIG. 2 is a sectional view of a strip-like strengthening member arranged on an edge of the optical membrane in a direction of a line A-A as illustrated in FIG. 1.

In some embodiments, each ridge line of the wave-shaped strip-like strengthening member may be a straight line parallel to the edge of the optical membrane, and FIG. 2 is a sectional view of the strip-like strengthening member 102 arranged on the edge of the optical membrane 101 in a direction of a line A-A as illustrated in FIG. 1, wherein the optical membrane 101 is of a thickness T.

Alternatively, each ridge line of the wave-shaped strip-like strengthening member may be a curve. The edge of the optical membrane is made to be of a wave shape, so that the stiffness of the edge is strengthened while no additional material is consumed. Thus, the manufacture of the optical membrane is facilitated.

In some embodiments the strip-like strengthening member 102 may be adhesive coated on the edges 103 of the optical membrane 101.

In some other embodiments, the strip-like strengthening member 102 may be a strengthening layer coated on the optical membrane 101, and the strengthening layer may be made of any appropriate material.

Furthermore, the present disclosure provides a backlight module including the optical membrane according to any one of embodiments in the present disclosure.

In some embodiment, the backlight module further includes a light strip, wherein the strip-like strengthening member of the optical membrane is arranged on an edge of the optical membrane that is close to the light strip. When the strip like strengthening member is arranged at one edge of the optical membrane, the strip-like strengthening member is arranged on the edge that is close to the light strip when mounting the optical membrane. Due to the heat generated by the light strip, the edge of the optical membrane that is close to the light strip is prone to be wrinkled. In this regard, in a simplified embodiment, the optical membrane includes a strip-like strengthening member that is arranged on the edge of the optical membrane that is close to the light strip when mounting the optical membrane.

Furthermore, the present disclosure provides a display device including the optical membrane and/or the backlight module according to any one of embodiments in the present disclosure.

Figure 3:
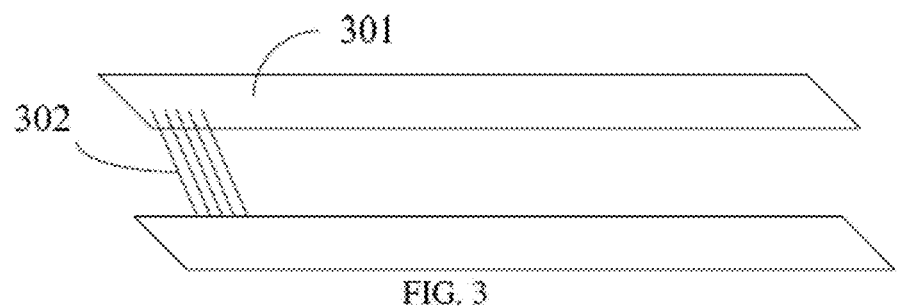
FIG. 3 illustrates a device for manufacturing the optical membrane according to an embodiment of the present disclosure.
Figure 4:
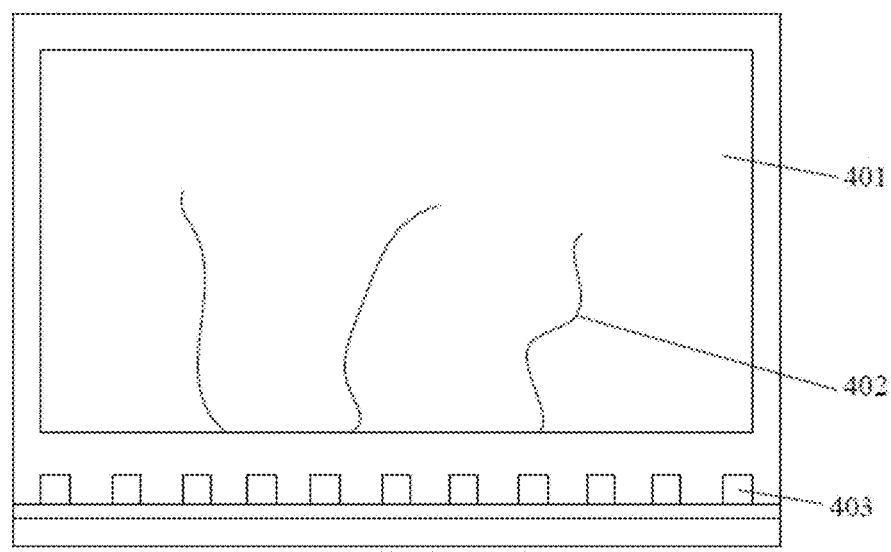
FIG. 4 illustrate the optical membrane being used in prior art.

Furthermore, the present disclosure provides a device for manufacturing the optical membrane according to the embodiments of the present disclosure. As illustrated in FIG. 3, the device includes: a cutter 301, configured to cut edges of the optical membrane; and linear members 302, arranged between two parallel blades of the cutter and configured to press the edges of the optical membrane into a wave shape.

The positions and quantities of the linear members 302 correspond to positions and quantities of the wave-shaped edges of the optical membrane respectively. The linear members 302 press the edges of the optical membrane into a wave shape while the optical membrane is being cut. The device as illustrated in FIG. 3 may manufacture the optical membrane with the wave-shaped edge.

Figure 5:
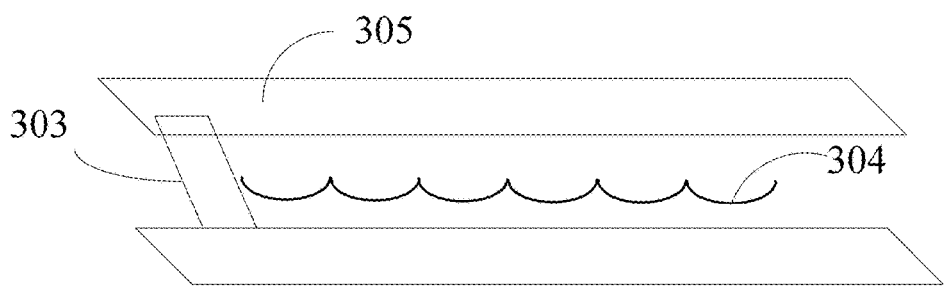
FIG. 5 illustrates another device for manufacturing the optical membrane according to an embodiment of the present disclosure.

Furthermore, the present disclosure provides a device for manufacturing the optical membrane with the wave-shaped edge. As illustrated in FIG. 5, the device includes: a cutter 305, configured to cut edges of the optical membrane; and a roller 303, configured to press the edges of the optical membrane into a wave shape.

In the above embodiment, the cutter 305 and the roller 303 may be separated or connected. When the cutter 305 and the roller 303 are connected, the roller 303 is connected between two parallel blades of the cutter 305, so that the roller 303 may press corresponding edges of the optical membrane into the wave shape when the roller rolls along a waved-shaped rail 304.

It can be seen from above that, in the present disclosure, the strip-like strengthening member is arranged on the edge of the optical membrane, so as to prevent the optical membrane from being deformed and wrinkled due to thermal expansion and cold shrinkage of the optical membrane caused by variation of the ambient temperature; and the present disclosure may also prevent the optical membrane from being deformed when the optical membrane is adopted in the display device, so that the display quality is ensured.

It is appreciated that the embodiments described herein are merely configured to illustrate and explain the present disclosure while not to limit the scope of the disclosure. The embodiments and the features in the embodiments can be combined with each other if possible.

It is appreciated that those skilled in the art may modify and improve the present disclosure without departing from the spirit and principle of the present disclosure. As a result, if those modification and improvement falls within the scope of claims and the equivalence thereof, those modification and improvement fall within the scope of the present disclosure.

What is claimed is:

1. An optical membrane, comprising:
    a strip-like strengthening member arranged at one or more edges of the optical membrane,
    wherein the strip-like strengthening member is of a uniform wave shape and formed integrally with the optical membrane, a whole surface of an entirety of the optical membrane is consisted of two main surfaces and side surfaces, the two main surfaces are opposite to each other, the side surfaces are at the edges of the optical membrane, and the strip-like strengthening member covers neither of the two main surfaces of the optical membrane, wherein each ridge line of the wave-shaped strip-like strengthening member is a straight line parallel to the edge of the optical membrane.

2. The optical membrane according to claim 1, wherein the strip-like strengthening member is arranged at one edge of the optical membrane.

3. The optical membrane according to claim 1, wherein the strip-like strengthening member is arranged at two or more edges of the optical membrane.

4. The optical membrane according to claim 3, wherein the optical membrane is of a rectangular shape, and the strip-like strengthening member is arranged at four edges of the optical membrane.

5. A backlight module comprising the optical membrane according to claim 1.

6. The backlight module according to claim 5, further comprising a light strip, wherein at least one strip-like strengthening member of the optical membrane is arranged at an edge of the optical membrane that is close to the light strip.

7. A display device comprising the backlight module according to claim 5.

8. A device for manufacturing the optical membrane according to claim 1, comprising:
    a cutter, configured to cut an original edge of the optical membrane; and
    linear members, arranged between two parallel blades of the cutter and configured to press the original edge of the optical membrane into the wave shape to form the strip-like strengthening member.

9. The device according to claim 8, wherein positions and quantities of the linear members correspond to positions and quantities of the edges of the optical membrane where the strip-like strengthening member is arranged respectively.

10. A device for manufacturing the optical membrane according to claim 1, comprising:
    a cutter, configured to cut an original edge of the optical membrane; and
    a roller, configured to press the original edge of the optical membrane into the wave shape to form the strip-like strengthening member.

11. The device according to claim 10, wherein the cutter is connected to the roller, and the roller is connected between two parallel blades of the cutter.

* * * * *